United States Patent [19]

Matsuura et al.

[11] 4,022,958

[45] May 10, 1977

[54] PROCESS FOR PREPARING POLYOLEFINS

[75] Inventors: Kazuo Matsuura, Kawasaki; Nobuyuki Kuroda, Yokohama; Toru Nakamura, Yokohama; Mituji Miyoshi, Naka, all of Japan

[73] Assignee: Nippon Oil Company Ltd., Tokyo, Japan

[22] Filed: Aug. 13, 1975

[21] Appl. No.: 604,442

Related U.S. Application Data

[63] Continuation-in-part of Ser. No. 454,142, March 22, 1974, abandoned.

[52] U.S. Cl. .......................... 526/124; 252/429 C; 526/125; 526/348; 526/352
[51] Int. Cl.² .................. C08F 4/02; C08F 10/02
[58] Field of Search ..... 260/93.7, 94.9 DA, 94.9 E; 526/124, 125

[56] References Cited

UNITED STATES PATENTS

| 3,642,760 | 2/1972 | Baekelmans et al. | 260/94.9 DA |
| 3,676,415 | 7/1972 | Diedrich et al. | 260/94.9 DA |

FOREIGN PATENTS OR APPLICATIONS

| 1,964,186 | 6/1971 | Germany |
| 2,111,455 | 9/1972 | Germany |
| 7,113,010 | 4/1972 | Netherlands |
| 1,314,198 | 4/1973 | United Kingdom |
| 1,140,649 | 1/1969 | United Kingdom |
| 1,258,984 | 1/1972 | United Kingdom |

*Primary Examiner*—Edward J. Smith

[57] ABSTRACT

The present invention relates to a process for preparing polyolefins using an improved polymerization catalyst. According to the invention, there is provided a process for preparing polyolefins by polymerizing or copolymerizing olefins using a catalyst prepared from a component with a titanium compound and/or a vanadium compound supported on a solid carrier and an organoaluminum compound and/or an organozinc compound, said solid carrier comprising a member selected from the group consisting of a reaction product A obtained by reacting (1) an organic carboxylate salt of magnesium and (2) an aluminum compound represented by the general formula $Al(OR)_3$ wherein R may be same as or different from each other and each R is an organic radical containing from 1 to 20 carbon atoms under such a condition that the aluminum compound is present in excess of a (2):(1) molar ratio of at least 1.6:1 and a reaction product B obtained by treating said reaction product A with a halogenating agent.

7 Claims, No Drawings

4,022,958

PROCESS FOR PREPARING POLYOLEFINS

This application is a continuation-in-part of Ser. No. 454,142, filed Mar. 22, 1974, now abandoned.

BACKGROUND OF THE INVENTION

1. Field of the Invention

The present invention is concerned with a process for polymerizing or copolymerizing olefins using an improved catalyst. More particularly, it relates to a process for preparing polyolefins which comprises polymerizing or copolymerizing an olefin using an improved catalyst obtained by supporting a solid carrier selected from the group consisting of a reaction product A obtained by reacting (1) an organic carboxylate salt of magnesium and (2) an aluminum compound represented by the general formula $Al(OR)_3$ wherein R may be same as or differnt from each other and each R is an organic radical containing from 1 to 20 carbon atoms under a condition that the aluminum compound is present in excess of a (2):(1) molar ratio of at least 1.6:1 and a reaction product B obtained by treating said reaction product A with a halogenating agent with a titanium compound and/or a vanadium compound followed by activation with organometallic compound(s), especially with an organoaluminum compound and/or an organometallic compound.

2. Description of the Prior Art

Heretofore in the technical field of this sort, it is known that systems composed of a titanium or a vanadium compound combined with an organometallic compound from metals of Group I-III in the Periodic Table can be used as an excellent catalyst for the polymerization of olefins. However, as the catalytic activity in the production of polyolefins is desired to be as high as possible, most of the aforementioned catalyst systems being relatively low in polymerizing activity should desirably be improved. On the other hand, it is also known that catalyst systems prepared from a carrier of a magnesium compound such as magnesium oxide, hydroxide or chloride with a component of Ziegler catalyst, namely, a titanium or vanadium compound supported can be superior catalyst for the polymerization of olefins. In this respect, attempts have recently been made of employing various metal compounds including magnesium ones.

Summary of the Invention

As a result of extensive studies on carrier-provided catalysts of this nature, we have found that reaction products obtained by reaction (1) an organic carboxylate salt of magnesium and (2) an aluminum compound represented by the general formula $Al(OR)_3$ wherein R may be same as or different from each other and each R is an organic radical containing from 1 to 20 carbon atoms under specified conditions can be a novel carrier excellent in the production of catalysts for the olefin polymerization.

We have further discovered during detailed investigations of the aforementioned catalyst system that the polymerizing activity can be increased by treating the above-stated carrier with a halogenating agent. The present invention was made on the basis of these discoveries.

Description of the Invention

According to the present invention, there are provided catalysts prepared by supporting a carrier selected from the group consisting of a reaction product obtained by reacting (1) an organic carboxylate salt of magnesium and (2) an aluminum compound represented by the general formula $Al(OR)_3$ wherein R may be same as or different from each other and each R is an organic radical containing from 1 to 20 carbon atoms under a condition that the aluminum compound is present in excess of a (2):(1) molar ratio of at least 1.6:1 and a reaction product B obtained by treating said reaction product A with a halogenating agent with a titanium compound and/or a vanadium compound followed by activation with organometallic compound(s), and a process for polymerizing olefins using the same. The catalyst according to the invention has a very high olefin-polymerizing activity and polymerization or copolymerizations with said catalyst offers a number of advantages. The partial pressure of monomer is low and the amount of residual catalyst in the polymer formed after polymerization in a short period of time is very low so that the step of removing the catalyst can be omitted. Consequently, the polymerization conditions are moderate and the polymer treating step are simplified. These advantages results in production of polyolefins with much economical merits. It is surprising that the residual catalyst in the polymer is very low even in the absence of catalyst-removing step and disadvantages in the prior molded products such as formation of the fish eye, end breakage of filament and opaqueness can remarkably improved.

Features of the invention in details will be apparent hereinbelow.

The catalysts of the invention are prepared by first reacting (1) an organic carboxylate salt of magnesium and (2) an aluminum compound represented by the general formula $Al(OR)_3$ wherein R is an organic radical containing from 1 to 20 carbon atoms at a (2):(1) ratio in excess of at least 1.6:1. The reactions conditions are chosen in such a way that the organic carboxylate ester is eliminated. For example, the reaction may be carried out in the absence of solvent but is conveniently in an inert solvent. After completion of the reaction, the unreacted aluminum compound is preferably washed with an inert solvent or removed by distillation. Any inert solvent may be used as the solvent and aliphatic, aromatic and alicyclic hydrocarbons such as hexane, octane, benzene, toluene, xylenes and decaline are usually employed. The reaction temperature is between 50° and 500° C. and preferably higher than 100° C. Temperatures as high as about 200° C. are often applied. There is no limitation to the reaction time but usually the range between 1 and 20–60 hours is suitable. The molar ratio of the reactants (1) an organic carboxylate salt of magnesium and (2) an aluminum compound represented by the general formula $Al(OR)_3$ is in such a manner that the aluminum compound is employed at a (2):(1) molar ratio in excess of at least 1.6:1 and preferably between 2:1 and 4:1 for the effective reaction.

As the organic carboxylate salt of magnesium usually used in the invention are mentioned the salts with mono-or polyvalent carboxylic acids containing from 2 to 32 carbon atoms, aliphatic, aromatic and alicyclic inclusive. Illustrative are substantially anhydrous carboxylate salts including aliphatic carboxylates such as formate, acetate, propionate and n-butyrate, naphthenate and aromatic carboxylates such as benzoate. Especially preferable is magnesium acetate. In every instance the use of the term 'organic carboxylate salt of magnesium' denotes the essential anionic grouping i.e.

carboxyl, to the exclusion of other essential anionic groups such as hydroxyl, for example. Thus, the preferred dicarboxylate salts may be represented by the formula $Mg(OOCR_1)_2$ wherein $R_1$ is aliphatic, aromatic or alicyclic and comprises from 2 to 32 carbon atoms.

As the aluminum compounds may be used those represented by the general formula $Al(OR)_3$ wherein R is an organic radical containing from 1 to 20 carbon atoms and may be the same or different. Illustrative of these compounds are aluminum trimethoxide, triethoxide, tri-n-propoxide, triisopropoxide, tri-n-butoxide, tri-sec.-butoxide, tri-t-butoxide and triphenoxide.

According to the present invention, the solid carrier prepared as above is supported with a titanium compound and/or a vanadium compound by the method as set forth hereinbelow. In the present invention the solid carrier may also be treated with a halogenating agent prior to being supported with a titanium compound and/or a vanadium compound by the method as set forth hereinbelow.

As the halogenating agent may be employed any of known halogenating agents for the organic and inorganic reactions provided that they are reacted with the solid carrier which is a reaction product between the above-mentioned organic carboxylate salt of magnesium and the aluminum compound and a substantial amount of halogen is introduced therewith into the solid carrier. Particularly may be employed chlorinating, brominating and iodizing agents. As the halogenating agent as such are mentioned hydrogen halides such as HCl, HBr and HI, halogenated methanes such as $CHCl_3$ and $CCl_4$, non-metallic oxyhalides such as $SOCl_2$, $SO_2Cl_2$, $COCl_2$ and $POCl_3$, non-metallic halides such as $PCl_3$, $PCl_5$ and $SiCl_4$, metal halides such as $AlCl_3$, organometallic halides such as $EtAlCl_2$ and $Et_3Al_2Cl_3$, ammonium halides such as $NH_4Cl$ and the like. Among metal halides non-heavy metal halides are preferable as the halogenating agent.

Conditions under which the solid carrier is treated with the halogenating agent may be widely varied and the reaction may be carried out in vapor, liquid or solid phase. For example, chosen are process involving contact of the halogenating agent in vapor phase with the solid carrier, one involving contact of the halogenating agent in liquid phase with the solid carrier in the presence or absence of an inert solvent, and one involving contact by mixture of the halogenating agent in solid phase with the solid carrier. The reaction conditions are chosen in a wide range. The temperature employed are generally between room temprerature and 400° C. and preferably between 50° and 200° C. The reaction time is between 1 minute and 24 hours and preferably between 10 min. and 5 hrs. The amount of the halogenating agent employed may widely be varied. After the reaction with the halogenating agent, the unreacted material is preferably removed by washing or drying under reduced pressure. As the solvent for the washing may be employed inert solvent such as inert hydrocarbons.

For supporting the carrier prepared as above with transition metal compound(s) composed of a titanium compound and/or a vanadium compound known methods may be employed. For example, the carrier comprising magnesium and aluminum prepared as described above, as it is or following the halogenation of said carrier, is contacted with the transition metal compound(s) in the presence or absence of an inert solvent under heating. It is convenient to effect the contact by heating the two at 50°–300° C., preferably at 100°–150° C. in the absence of a solvent. There is no limitation to the reaction time but usually the reaction is made for 5 minutes or longer. It may be made for a long period of time though this is not necessary. For example, a period of time for the treatment in the range from 5 min. to 10 hrs. may be cited. Another supporting method conveniently employed involves mechanical contact of the two component by means of a ball mill. The treatment, of course, should be carried out under an oxygen- and moisture-free inert gas. The transition metal halide(s) used in the invention may be in an amount from 0.01 to 50 times more than that of the carrier. Excess transition metal halide(s) after the blending-under-heating treatment is desired to be removed by washing with a solvent. Any means may be employed for removing the unreacted transition metal compound(s) after completion of the reaction. It is usually applied to wash the product with a solvent inert to the Zieglar catalyst several times and evaporate the washing under reduced pressure to recover the powdered solid.

The olefin polymerization reaction using the catalyst of the invention is carried out in the same way as in the olefin polymerization reaction by means of a conventional Ziegler catalyst. Substantially oxygen- and moisture-free conditions are maintained throughout the reaction. Other conditions for the polymerization of olefins include a temperature in the range from 20° to 300° C. preferably from 50° to 180° C. and a pressure in the range from normal to 70 kg./cm.$^2$ preferably from 2 to 60 kg./cm.$^2$. Control of the molecular weight may be achieved to a certain degree by changing the polymerization conditions such as temperature and molar ratio of the catalyst, and it is efficiently effected by adding hydrogen to the polymerization system. With the catalyst of the invention, two- or more-stage polymerization reactions involving varied polymerization conditions of hydrogen concentrations and polymerization temperatures may be carried out without any trouble.

The process of the present invention can be applied to all the olefins polymerizable with Ziegler catalyst. For example, it is conveniently used with homopolymerization of α-olefins such as ethylene and 1-butene as well as with ethylene-propylene, ethylene-1-butene, propylene-1-butene copolymerizations and the like.

Preferable transitions metal compounds used in the invention are titanium and vanadium halides that are in liquid phase under the treating conditions. Illustrative are tetravalent titanium halides such as titanium tetrachloride, ethoxytitanium trichloride, diethoxytitanium dichloride, dibutoxytitanium dichloride and phenoxytitanium trichloride, tetravalent vanadium halogenides such as vanadium tetrachloride and pentavalent vanadium halogenide such as vanadium oxytrichloride.

As the organometallic compound used in the invention may be mentioned organometallic compounds from metals of Group I-IV of the Periodic Table which is generally known as a component of Ziegler, catalyst, and especially preferable are organoaluminum and organozinc compounds. Illustrative are organoaluminum compounds of the general formulae $R^1_3Al$, $R^1_2AlX$, $R^1AlX_2$, $R^1_2AlOR$, $R^1Al(OR)X$ and $R^1_3Al_2X_3$ wherein $R^1$ is alkyl or aryl and X is halogen and organozinc compounds of the general formula $R''_2Zn$ wherein $R''$ is alkyl including triethylaluminum, triisobutylaluminum, trihexylaluminum, trioctylaluminum, diethylaluminum chloride, ethylaluminum sesquichloride, diethylzinc and mixtures thereof. There is no limitation to the amount of organometallic compound used in the invention and the compound is usually used at a molar ratio from 0.1 to 1000 against the transition metal halogenide.

DESCRIPTION OF PREFERRED EMBODIMENTS

The examples which follow are submitted to illustrate and not to limit the invention.

EXAMPLE 1.

a. Preparation of the catalyst.

A mixture of 14.2 g. (0.1 mol.) of anhydrous magnesium acetate $Mg(OOCCH_3)_2$ and 40.8 g. (0.2 mol.) of aluminum triisopropoxide in 50 ml. of decaline was heated at 170°–230° C. for 10 hrs. As the reaction proceeded, light distillates were removed and the solvent was finally removed by distillation under reduced pressure to give a powdered solid. The solid was purified by washing with several 100-ml. portions of hexane and dried under reduced pressure to yield a powdered solid. To the solid was then added 80 ml. of titanium tetrachloride and the mixture was heated at 150° C. for 2 hrs. After completion of the reaction the reaction mixture was washed with hexane repeatedly until $TiCl_4$ was negative in the washing. The solid portion was dried and analyzed to find that 249 mg. of titanium was supported per g. of the solid.

b. Polymerization

A 2-l. stainless steel autoclave equipped with an induction stirrer was purged with nitrogen and charged with 1000 ml. of hexane. To it were added 6 mmol. of triethylaluminum and 153mg. of the above-mentioned solid and the temperature was raised to 90° C. with stirring. The system, which was at a pressure of 2 kg./cm.² from vapor pressure of the hexane, was pressurized with hydrogen to a total pressure of 4.4 kg./cm² and then with ethylene to a total pressure of 10 kg./cm.² followed by initiation of the polymerization. Ethylene was continuously introduced to maintain the total pressure at 10 kg./cm.² while conducting the polymerization for 15 min. After completion of the polymerization, the polymer slurry was transferred to a beaker, from which hexane was removed under reduced pressure to obtain 221 g. of white polyethylene with a melt index of 0.14. The polymerization activity was 1,030 g. polyethylene/g. solid.hr..$C_2H_4$ pressure, 4,140 g. polyethlene/g. Ti.hr..$C_2H_4$ pressure.

EXAMPLE 2.

A catalyst was prepared in the same way as in Example 1 except that the aluminum triisopropoxide used therein was 71.2 g. (0.3 mol.) to give a solid with 273 mg. of titanium per g. supported. A polymerization was made for 15 min. in the same way as in Example 1 except that 116 g. of the solid was employed to yield 171 g. of white polyethylene with a melt index of 0.10. The polymerization activity was 1,053 g. polyethylene/g. solid.hr..$C_2H_4$ pressure, 3,860 g. polyethylene/g. Ti.hr..$C_2H_4$ pressure.

EXAMPLE 3.

A catalyst was prepared in the same way as in Example 1 except that 49.2 g. (0.2 mol.) of aluminum tri-sec.-butoxide was used in place of the aluminum isopropoxide used therein to give a solid with 226 mg. of Ti per g. supported. A polymerization was made for 15 min. in the same way as in Example 1 except that 108 mg. of the solid was employed to yield 139 g. of white polyethylene with a melt index of 0.11. The polymerization activity was 921 g. polyethylene/g. solid.hr..$C_2H_4$ pressure, 4,080 g. polyethylene/g. Ti.hr..$C_2H_4$ pressure.

Reference Example 1

A catalyst was prepared in the same way as in Example 1 using anhydrous magnesium acetate as the carrier. A polymerization was made with the catalyst to find that the polymerization activity was very low: 35 g./g.solid.hr..$C_2H_4$ pressure, 1,130 g./g. Ti.Hr..$C_2H_4$ pressure. The result clearly indicate that the high polymerization activity in Example 1 is not ascribed to the remaining magnesium acetate component.

EXAMPLE 4

A polymerization was made for 15 min. in the same way as in Example 1 except that 121 mg. of the catalyst prepared in Example 1 was employed and 10 mmol. of diethylzinc was used in place of the triethylaluminum to yield 129 g. of white polyethylene with a melt index of 0.18. The polymerization activity was 762 g. polyethylene/g. solid.hr..$C_2H_4$ pressure, 3,060 g. polyethylene/g. Ti.hr..$C_2H_4$ pressure.

EXAMPLE 5

A catalyst was prepared in the same way as in Example 1 except that vanadium tetrachloride was employed in place of the titanium tetrachloride used therein to give a solid with 221 mg. of vanadium per g. solid supported. A polymerization was made for 15 min. in the same way as in Example 1 except that 182 mg. of the solid was employed to yield 175 g. of white solid with a melt index of 0.08. The polymerization index was 3,100 g. polyethylene/g. V.hr..$C_2H_4$ pressure, 685 g. polyethylene/g. solid.hr..$C_2H_4$ pressure.

EXAMPLE 6

A polymerization was carried out for 15 min. using 134 mg. of the catalyst prepared in Example 1, 5 mmol. of triethylaluminum and 1000 ml, of hexane, introducing hydrogen to a pressure of 1.5 kg./cm.² and supplying an ethylene-propylene mixture containing 2 mol.% propylene at 70° C. to maintain the pressure in the autoclave at 7 kg. /cm.². There was produced 156 g. of ethylene-propylene copolymer with a melt index of 5.7. The catalyst activity was 831 g. polyethylene/g. solid.hr..pressure, 3,340 g. polyethylene/g. To.hr..pressure.

EXAMPLE 7 a. Preparation of the catalyst.

Mixture of 14.2 g. (0.1 mol.) of anhydrous magnesium acetate and 40.8 g. (0.2mol.) of aluminum triisopropoxide in 50 ml. of decaline was heated at 170°–230° C. for 10 hours. As the reaction proceeded, light distillates were removed and the solvent was finally removed by distillation under reduced pressure to give a powdered solid. The solid was purified by washing with several 100-ml. portions of hexane and dried under reduced pressure to yield a powdered solid. To the solid was added 120 g. of silicon tetrachloride as the halogenating agent and the mixture was heated at 100° C. for 1 hr. The unreacted material was then removed by heating under reduced pressure to give a solid carrier.

To the carrier thus obtained was added 80 ml. of titanium tetrachloride and the mixture was heated at 150° C. for 2 hours. After completion of the reaction the reaction mixture was washed with hexane repeatedly until the titanium tetrachloride was negative in the washing. The solid portion was dried and analyzed to find that 63 mg. of titanium was supported per g. of the solid.

b. Polymerization

A 2-1. stainless steel autoclave equipped with an induction stirrer was purged with nitrogen and charged with 1000 ml. of hexane. To it were added 6 mmol. of triethylaluminum and 90 mg. of the above mentioned solid and the temperature was raised to 90° C. with stirring. The system, which was at a pressure of 2 kg./cm.$^2$ from vapor pressure of the hexane, was pressurized with hydrogen to a total pressure of 4.4 kg./cm.$^2$ and then with ethylene to a total pressure of 10 kg./cm.$^2$ followed by initiation of the polymerization. Ethylene was continuously introduced to maintain the total pressure at 10 kg./cm.$^2$ while conducting the polymerization for 15 min. After completion of the polymerization, the polymer slurry was transferred to a beaker, from which the hexane was removed under reduced pressure to obtain 172 g. of white polyethylene with a melt index of 0.73.

The polymerization activity was 1,363 g. polyethylene/g. solid.hr..C$_2$H$_4$ pressure, 21,650 g. polyethylene/g. Ti.hr..C$_2$H$_4$ pressure, which was apparently superior to that in Example 1.

EXAMPLE 8

A catalyst was prepared in the same way as in Example 7 except that 12 g. of aluminum trichloride etherate was used in place of the silicon tetrachloride and treated in hexane at 70° C. for 2 hrs. to give a catalyst with 30 mg. of titanium per g. of the solid. A polymerization was made in the same way as in Example 7 except that 46 mg. of the catalyst was employed to yield 77 g. of white polyethylene with a melt index of 0.65. The activity was 1,195 g. polyethylene/g. solid.hr..C$_2$H$_4$ pressure, 30,600 g. polyethylene/g. Ti.hr..C$_2$H$_4$ pressure.

EXAMPLE 9

A carrier was prepared in the same way as in Example 7 except that 49.2 g. (0.2 mol.) of aluminum tri-sec.-butoxide was used in place of the aluminum triisopropoxide. Like Example 7, the carrier was then reacted with 120 g. of silicon tetrachloride for 1 hr. followed by removal of the unreacted material by heating under reduced pressure. To the resulting mass was added 80 ml. of titanium tetrachloride and the mixture was heated at 150° C. for 2 hrs. After completion of the reaction, washing with hexane was repeated. The solid portion was dried and analyzed to find that 59 mg. of titanium was supported per g. of the solid. A polymerization was made for 15 min. in the same way as in Example 7 except that 53 mg. of the above-mentioned catalyst was employed to yield 92 g. of white polyethylene with a melt index of 0.81. The activity was 1,240 g. polyethylene/g. solid.hr..C$_2$H$_4$ pressure, 21,000 g. polyethylene/g. Ti.hr..C$_2$H$_4$ pressure, which was apparently superior to that in Example 3.

EXAMPLE 10

A polymerization was made for 15 min. in the same way as in Example 7 using 37 mg. of the catalyst prepared in Example 7 and 10 mmol. of diethylzinc to yield 52 g. of white polyethylene with a melt index of 0.93. The activity was 1000 g. polyethylene/g. solid.hr..C$_2$H$_4$ pressure, 15,900 g. polyethylene/g. Ti.hr..C$_2$H$_4$ pressure.

EXAMPLE 11

A catalyst was prepared in the same way as in Example 7 except that vanadium tetrachloride was reacted in place of the titanium tetrachloride to give a solid with 55 mg. of vanadium supported per g. of the solid. A polymerization was made for 15 min. in the same way as in Example 7 except that 85 mg. of the solid was employed to yield 102 g. of white polyethylene with a melt index of 4.2. The activity was 857 g. polyethylene/g. solid.hr..C$_2$H$_4$ pressure, 15,600 g. polyethylene/g. V.hr..C$_2$H$_4$ pressure.

EXAMPLE 12.

A polymerization was carried out for 15 min. using 32 mg. of the catalyst prepared in Example 7, 5 mmol. of triethylaluminum and 1000 ml. of hexane, introducing hydrogen to a pressure of 1.5 kg./cm.$^2$, and supplying and ethylene-propylene mixture containing 2 mol.% propylene at 70° C. to maintain the pressure in the autoclave at 7 kg./cm.$^2$ There was produced 44 g. of ethylenepropylene copolymer the structure of which was confirmed by infra-red spectrum measurement with a melt index of 3.9. The activity was 1,100 g. polyethylene/g. solid.hr..pressure, 17,500 g. polyethylene/g. Ti.hr..pressure.

We claim:

1. Process for preparing polyolefins by polymerizing or copolymerizing olefins using a catalyst prepared from a component with a transition metal compound supported on a solid carrier and an organoaluminum compound and/or an organozinc compound, said transition metal compound being selected from the group consisting of titanium tetrachloride, ethoxytitanium trichloride, diethoxytitanium dichloride, dibutoxytitanium dichloride, phenoxytitanium trichloride, vanadium tetrachloride and vanadium oxychloride, said solid carrier comprising a member selected from the group consisting of a reaction product A obtained by reacting (1) an organic dicarboxylate salt of magnesium represented by the general formula Mg(OOCR)$_2$ wherein R is an aliphatic, aromatic or alicyclic having 2 to 32 carbon atoms and (2) an aluminum compound selected from the group consisting of aluminum trimethoxide, aluminum triethoxide aluminum tri-n-propoxide, aluminum triisopropoxide, aluminum tri-n-butoxide, aluminum tri-sec-butoxide, aluminum tri-t-butoxide and aluminum triphenoxide, at a temperature in the range from 50° to 500° C. for a period of time in the range from 1 to 30 hours, the molar ratio of said aluminum compound to said organic dicarboxylate salt of magnesium ranging from 1.6:1 to 4:1, and a reaction product B obtained by treating said reaction product A with a halogenating agent selected from the group consisting of molecular halogens, non-metallic halides, non-metallic oxyhalides, metal halides and organometallic halides at a temperature in the range from room temperature to 400° C. for a period of time in the range from 1 minute to 24 hours.

2. Process according to claim 1 wherein said solid carrier is obtained by reacting (1) said organic dicarboxylate salt of magnesium and (2) said aluminum compound in the presence of an inert solvent.

3. Process according to claim 2 wherein the inert solvent is an aliphatic, aromatic or alicyclic hydrocarbon selected from the group consisting of hexane, heptane, octane, benzene, toluene, xylenes and decaline.

4. Process according to claim 1 wherein homopolymerization of an α-olefin selected from the group consisting of ethylene, propylene and l-butene or copolymerization of ethylene and propylene, ethylene and l-butene or propylene and l-butene is made.

5. Process according to claim 1 wherein the olefin polymerization is made at a temperature in the range from 20° to 300° C. under a pressure in the range from atomspheric pressure to 70 kg./cm.$^2$.

6. The process of claim 1, wherein said organic dicarboxylate consists essentially of formate, acetate, propionate, n-butyrate, naphthenate or benzoate.

7. Process according to claim 1 wherein the transition metal compound is used in an amount from 0.01 to 50 times more than the carrier by weight.

* * * * *

UNITED STATES PATENT OFFICE
CERTIFICATE OF CORRECTION

PATENT NO. : 4,022,958
DATED : May 10, 1977
INVENTOR(S) : Matsuura et al.

It is certified that error appears in the above-identified patent and that said Letters Patent are hereby corrected as shown below:

Col. 8, line 13, "4.2" should read as --0.42--

Signed and Sealed this

Twentieth Day of September 1977

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,022,958   Dated May 10, 1977

Inventor(s) Kazuo Matsuura, et al

It is certified that error appears in the above-identified patent and that said Letters Patent are hereby corrected as shown below:

On the cover sheet, insert

--Foreign Application Priority Data
    March 26, 1973    Japan    48-33501
    April 17, 1973    Japan    48-42678 --

Signed and Sealed this

Nineteenth Day of September 1978

[SEAL]

Attest:

RUTH C. MASON
*Attesting Officer*

DONALD W. BANNER
*Commissioner of Patents and Trademarks*